US012525159B2

(12) United States Patent
Jiang

(10) Patent No.: US 12,525,159 B2
(45) Date of Patent: Jan. 13, 2026

(54) METHOD AND SYSTEM FOR DETECTING VISUAL ARTEFACT OF NEAR-EYE DISPLAY

(71) Applicant: JADE BIRD DISPLAY (SHANGHAI) LIMITED, Shanghai (CN)

(72) Inventor: Xingtong Jiang, Shanghai (CN)

(73) Assignee: JADE BIRD DISPLAY (SHANGHAI) LIMITED, Shanghai (CN)

( * ) Notice: Subject to any disclaimer, the term of this patent is extended or adjusted under 35 U.S.C. 154(b) by 223 days.

(21) Appl. No.: 18/537,671

(22) Filed: Dec. 12, 2023

(65) Prior Publication Data

US 2024/0203308 A1 Jun. 20, 2024

(30) Foreign Application Priority Data

Dec. 14, 2022 (WO) ................ PCT/CN2022/139060

(51) Int. Cl.

*G09G 3/32* (2016.01)
*G01M 11/02* (2006.01)
*G09G 3/00* (2006.01)

(52) U.S. Cl.

CPC ......... *G09G 3/006* (2013.01); *G01M 11/0207* (2013.01); *G09G 3/001* (2013.01); *G09G 3/003* (2013.01); *G09G 3/32* (2013.01); *G09G 2320/0233* (2013.01); *G09G 2320/0257* (2013.01)

(58) Field of Classification Search

CPC ...................................................... G09G 3/006
See application file for complete search history.

(56) References Cited

U.S. PATENT DOCUMENTS

| | | | | |
|---|---|---|---|---|
| 2007/0126675 A1 | 6/2007 | Lee et al. | | |
| 2008/0180592 A1* | 7/2008 | Yu | G09G 3/3677 | 349/54 |
| 2019/0318677 A1 | 10/2019 | Lu et al. | | |
| 2021/0072429 A1 | 3/2021 | Meng et al. | | |

FOREIGN PATENT DOCUMENTS

| | | |
|---|---|---|
| CN | 106464861 A | 2/2017 |
| CN | 208384235 U | 1/2019 |
| CN | 113112444 A | 7/2021 |

OTHER PUBLICATIONS

International Search Report and Written Opinion in counterpart PCT Application No. PCT/CN2022/139060, mailed Sep. 13, 2023.

* cited by examiner

*Primary Examiner* — Thanh Luu
(74) *Attorney, Agent, or Firm* — FINNEGAN, HENDERSON, FARABOW, GARRETT & DUNNER LLP

(57) ABSTRACT

A method and a system for detecting a visual artefact of near-eye display are provided. The method includes generating a plurality of sub-test patterns, each of the sub-test patterns corresponding to a portion of pixels of a source pixel array of the near-eye display being turned on, and a full test pattern comprising all the plurality of sub-test patterns corresponds to each of the pixels of the source pixel array being turned on at least once; obtaining a plurality of sub-virtual images corresponding to the plurality of sub-test patterns; obtaining a final virtual image by integrating the plurality of sub-virtual images; and detecting the visual artefact, if any, based on the final virtual image.

22 Claims, 8 Drawing Sheets

METHOD AND SYSTEM FOR DETECTING VISUAL ARTEFACT OF NEAR-EYE DISPLAY

CROSS-REFERENCE TO RELATED APPLICATIONS

The present disclosure claims priority to and the benefits of PCT Application No. PCT/CN2022/139060, filed on Dec. 14, 2022, which is incorporated herein by reference in its entirety.

TECHNICAL FIELD

The present disclosure generally relates to a near-eye display technology, and more particularly, to a method and system for detecting a visual artefact of near-eye display.

BACKGROUND

Near-eye displays (NEDs) may be provided as an augmented reality (AR) display, a virtual reality (VR) display, a Head Up/Head Mount or other displays. Generally, a NED usually comprises an image generator and an optical combiner. The image generator is commonly a projector with micro displays (e.g., micro-LED, micro-OLED, LCOS, or DLP) and optical lens integrated. The optical combiner includes reflective and/or diffractive optics, such as freeform mirror/prism, birdbath, cascaded mirrors, or grating coupler (waveguide). A virtual image is rendered from NEDs to human eyes with/without ambient light.

Visual artefacts are a key issue in evaluating the image quality of displays, which is more serious issue for a NED since the NED is close to human eyes. The visual artefacts may include defects, mura/nonuniformity, ghosts, etc. A defect in a virtual image rendered in NEDs is generally a visual artefact which originated from one or more defective pixels of the image generator (e.g. micro-LED or micro-OLED). The defect may manifest as a brighter, darker, or dead dot, line, or zone. Nonuniformity is a fatal visual artefact, which dramatically influences the image quality. The visual artefact may be illustrated as a mottled, bright, or black spot, or cloud appearance. For NEDs such as AR/VR, the visual artefact is apparently observable on the virtual image.

However, due to pixel-level crosstalk or low image resolution on virtual image in NEDs, it is challenging to detect the visual artefacts in measurement.

SUMMARY OF THE DISCLOSURE

Embodiments of the present disclosure provide a method for detecting a visual artefact of near-eye display. The method includes generating a plurality of sub-test patterns, each of the sub-test patterns corresponding to a portion of pixels of a source pixel array of the near-eye display being turned on, and a full test pattern comprising all the plurality of sub-test patterns corresponds to each of the pixels of the source pixel array being turned on at least once; obtaining a plurality of sub-virtual images corresponding to the plurality of sub-test patterns; obtaining a final virtual image by integrating the plurality of sub-virtual images; and detecting the visual artefact, if any, based on the final virtual image.

Embodiments of the present disclosure provide a system for detecting a visual artefact of near-eye display. The system includes a light measuring device (LMD) configured to: obtain a plurality of sub-virtual images corresponding to a plurality of sub-test patterns; and detect the visual artefact based on a final virtual image; and a processor configured to: generate a plurality of sub-test patterns, each of the sub-test patterns corresponding to a portion of pixels of a source pixel array of the near-eye display being turned on, and a full test pattern comprising all the plurality of sub-test patterns corresponds to each of the pixels of the source pixel array being turned on at least once; and integrate the plurality of sub-virtual images to obtain the final virtual image.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

Figure 1:
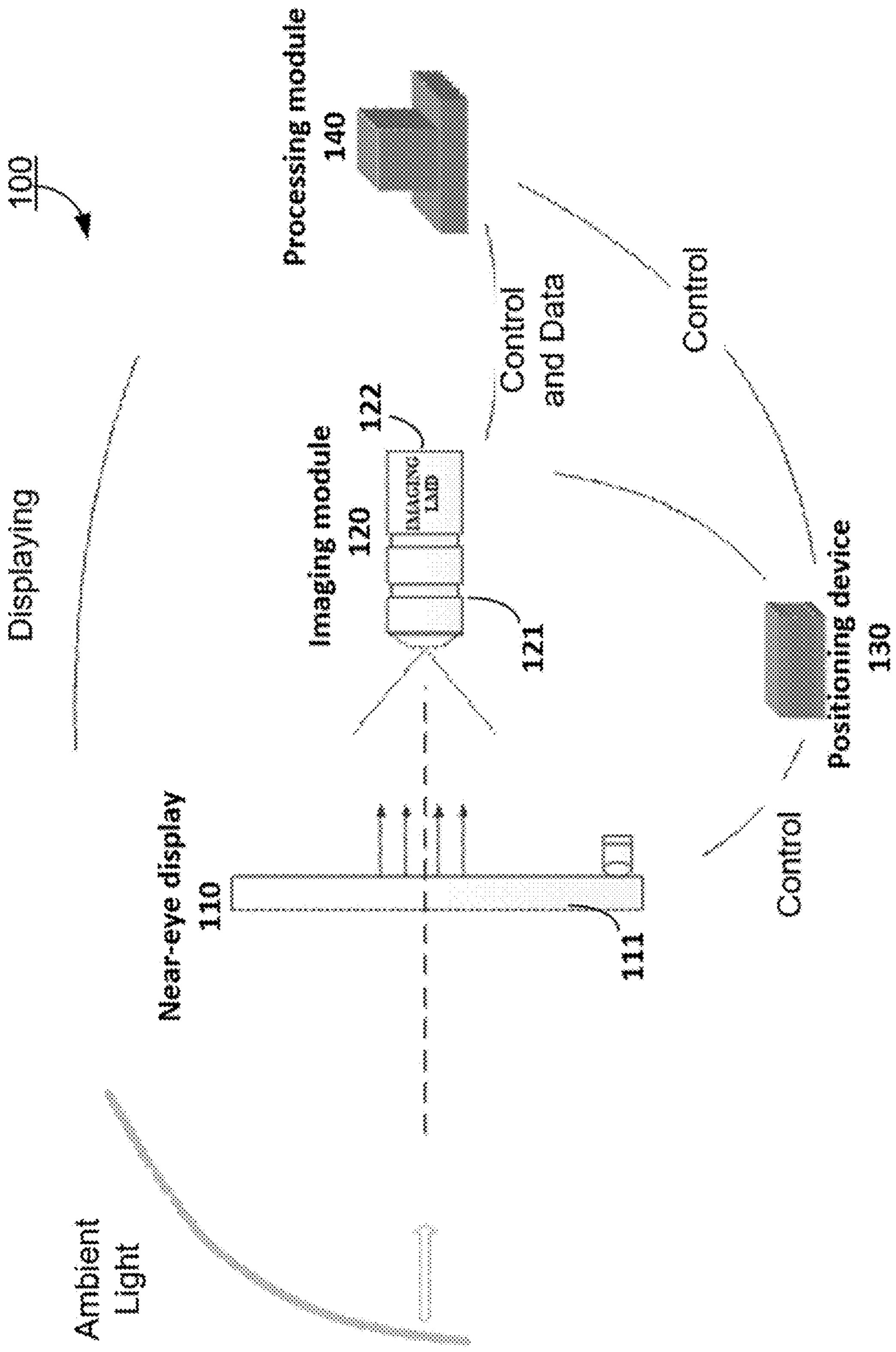
FIG. 1 is a schematic diagram of an exemplary system for detecting visual artefacts, according to some embodiments of the present disclosure.

FIG. 1 is a schematic diagram of an exemplary system 100 for detecting visual artefacts, according to some embodiments of the present disclosure. As shown in FIG. 1, system 100 includes a near-eye display (NED) 110 for displaying images to human eyes, an imager provided as an imaging module 120, a positioner provided as a positioning device 130, and a processor provided as a processing module 140. Additionally, ambient light can be provided by an ambient light module (not shown). NED 110 can be provided as an AR (augmented reality) display, VR (virtual reality) display, Head-Up/Head-Mount display, or other displays. Positioning device 130 is provided to set an appropriate spatial relation between NED 110 and imaging module 120. For example, positioning device 130 is configured to set a distance between NED 110 and imaging module 120 in a range of 10 mm-25 mm. Positioning device 130 can further adjust the relative positions (e.g., the distance and spatial position) of NED 110 and imaging module 120. Imaging module 120 is configured to emulate the human eye to measure display optical characteristics and to observe display performance. In some embodiments, imaging module 120 can include an array light measuring device (LMD) 122 and a NED lens 121. For example, LMD 122 can be a colorimeter or an imaging camera, such as a CCD (charge coupled device) or a CMOS (complementary metal oxide semiconductor) image sensor. NED lens 121 of imaging module 120 is provided with a front aperture having a small diameter of e.g., 1 mm-6 mm. Therefore, NED lens 121 can provide a wide view field (e.g., 60-180 degrees) in front, and NED lens 121 is configured to emulate a human eye to observe NED 110. The optical properties of the virtual image are measured by imaging module 120 based on positioning device 130.

In some embodiments, NED 110 can include an image generator 111, and an optical combiner, also referred to herein as image optics (not shown in FIG. 1). Image generator 111 can be a micro display such as a micro-LED, micro-OLED, LCOS, or DLP display, and can be configured to as a light engine with an additional projector lens. In some embodiments, the micro display includes a micro display panel and a plurality of lens. The micro display panel includes a micro light emitting array which can form an active emitting area. For example, the micro display panel is a micro inorganic-LED display panel, a micro-OLED display panel, or a micro-LCD display panel. The projected image from the light engine through designed optics is transferred to human eyes through the optical combiner. The optics of the optical combiner can be reflective and/or diffractive optics, such as a free form mirror/prism, birdbath, or cascaded mirrors, grating coupler (waveguide), etc.

Processing module 140 is configured to evaluate and improve uniformity/nonuniformity for the virtual image rendered in NED 110. In some embodiments, processing module 140 can be included in a computer or a server. In some embodiments, processing module 140 can be deployed in the cloud, which is not limited herein. In some embodiments, processing module 140 can include one or more processors.

In some embodiments, a driver provided as a driving module (not shown in FIG. 1) can be further provided to drive the image for display by NED 110. The drive module can be coupled to communicate with NED 110, specifically to communicate with image generator 111 of NED 110. For example, the driving module can be configured to adjust the gray values of image generator 111.

In some embodiments, for example for an AR application, ambient light is provided from the ambient light module. The ambient light module is configured to generate a uniform light source with corresponding color (such as D65), which can support a measurement taken with an ambient light background, and simulation of various scenarios such as daylight, outdoor, or indoor.

Figure 2:
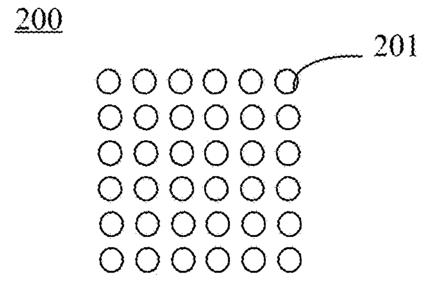
FIG. 2 illustrates an exemplary source pixel array provided by a NED, according to some embodiments of the present disclosure.

FIG. 2 illustrates an exemplary source pixel array 200 provided by a NED, according to some embodiments of the present disclosure. As shown in FIG. 2, source pixel array 200 is a 6×6 matrix. It can be understood that in other embodiments, a number of pixels 201 in source pixel array 200 can be varied, for example, a 9×9 matrix, or a 12×12 matrix. Generally, when detecting a visual artefact of a visual image, the visual image is rendered for a test pattern provided by source pixel array 200. In the test pattern, all of pixels 201 (i.e., 36 pixels in this example) are turned on at the same time. If one pixel malfunctions, which may cause a visual artefact, such visual artefact should be detected from the visual image. However, since a distance between two adjacent pixels 201 is small, a pixel-level crosstalk may exist, which may impact visual artefact detection. And due to low clarity (resolution) of a rendered virtual image, the visual artefact may be blurred and not precisely detectable. In some embodiments, source pixel array 200 is a micro-LED array, each pixel corresponding to a micro-LED.

Figure 3:
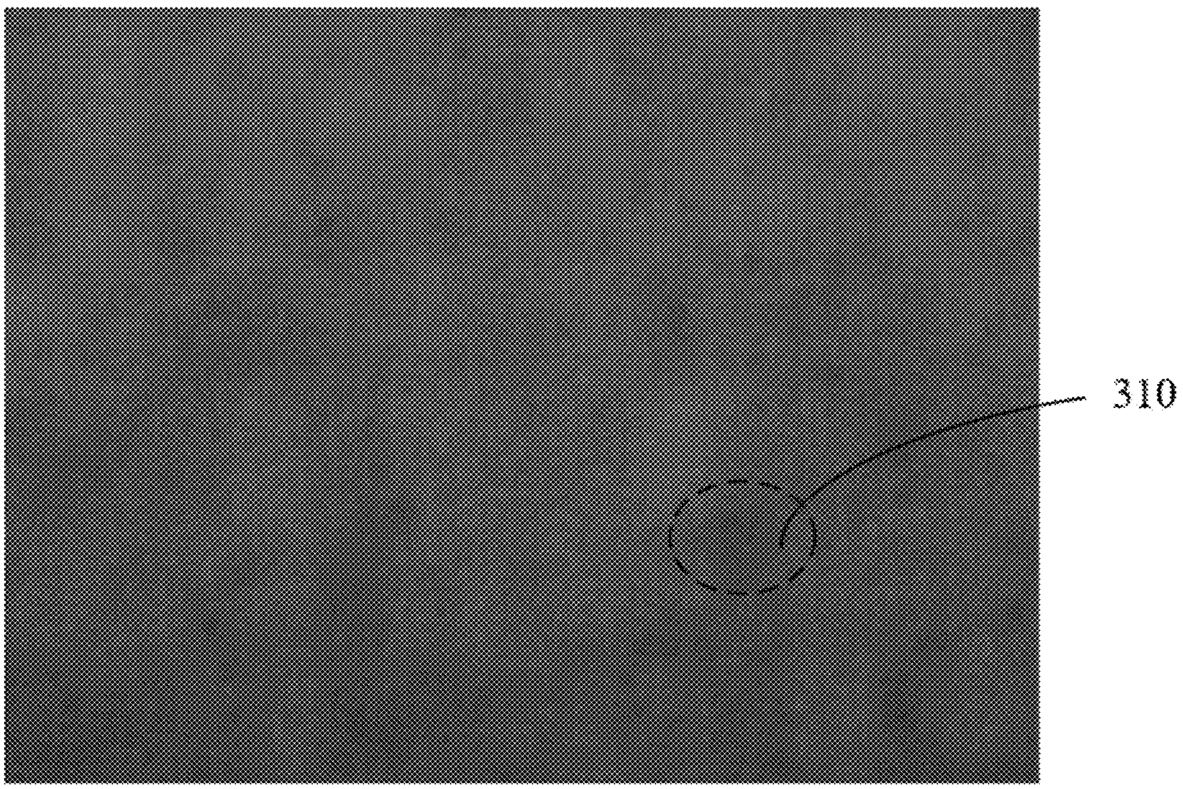
FIG. 3 illustrates an exemplary virtual image captured from a normal full-on white pattern, according to some embodiments of the present disclosure.

FIG. 3 illustrates an exemplary virtual image captured from a normal full-on white pattern, according to some embodiments of the present disclosure. As shown in FIG. 3, the image has some dark areas, for example, area 310, illustrating a visual artefact in the image, which may be caused by dysfunction of one or more pixels. However, such visual artefact is shown as a vague area without clear contrast boundary, and it is difficult to detect by LMD 122.

In order to improve the performance of detecting visual artefacts of a NED, the present disclosure provides a method for detecting such visual artefacts.

In some embodiments of the present disclosure, a source pixel array can be turned on to perform, i.e., display, a plurality of sub-test patterns, and corresponding sub-virtual images are obtained, respectively. In each sub-test pattern, a portion of the source pixel array pixels are turned on. All the sub-test patterns together constitute a full test pattern. Therefore, all the sub-virtual images can be integrated into a final visual image where all the pixels are turned on. Since for each sub-test pattern only a portion of pixels are turned on, the pixel level cross-talk may be reduced.

Figure 4:
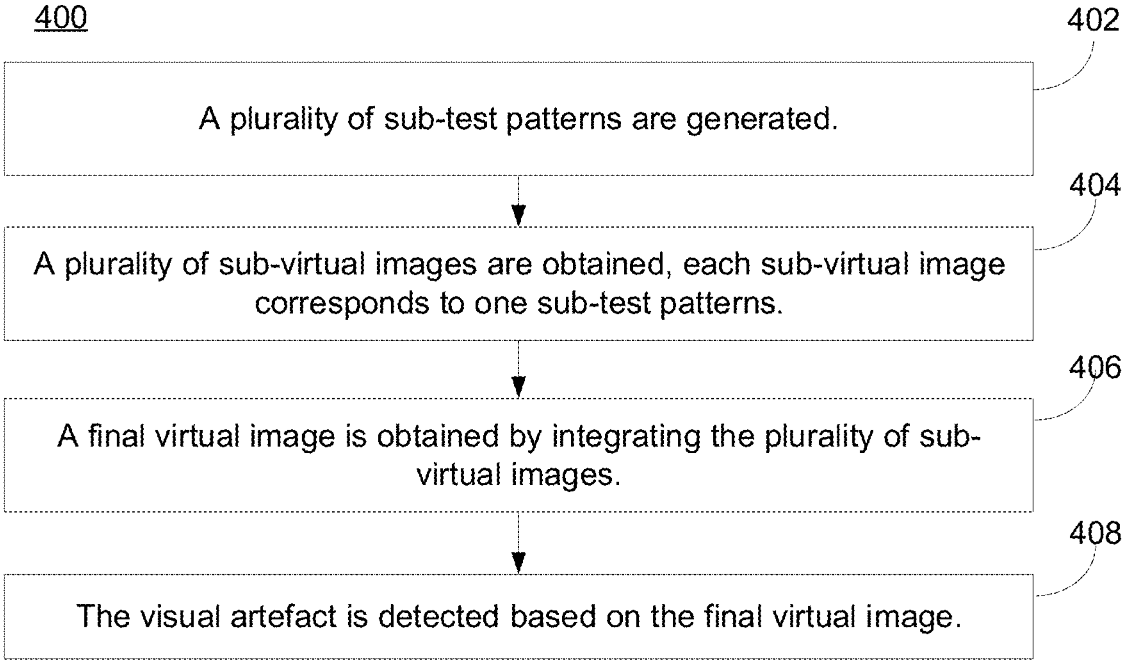
FIG. 4 illustrates a flowchart of an exemplary method for detecting a visual artefact of NED, according to some embodiments of the present disclosure.

FIG. 4 illustrates a flowchart of an exemplary method 400 for detecting a visual artefact of a NED, according to some embodiments of the present disclosure. The method 400 includes steps 402 to 408.

At step 402, a plurality of sub-test patterns are generated. A sub-test pattern corresponds to a portion of the source pixel array pixels being turned on, and a full test pattern includes all the plurality of sub-test patterns corresponds to all pixels of the source pixel array turned on at least once.

In some embodiments, the sub-test patterns can be overlapped. That is, a pixel can be included in two or more sub-test patterns. In this example, a pixel can be turned on more than once.

Figure 5:
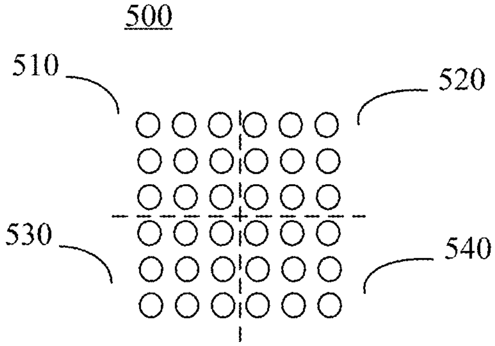
FIG. 5 illustrates an exemplary source pixel array divided into four zones, according to some embodiments of the present disclosure.
Figure 6:
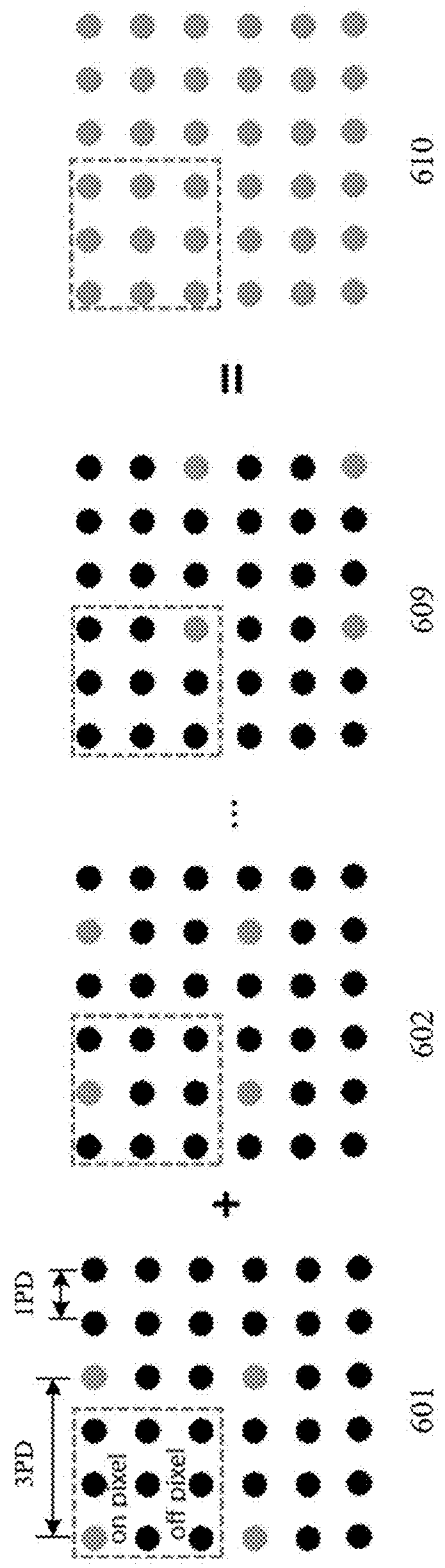
FIG. 6 illustrates an exemplary process to generate sub-test patterns, according to some embodiments of the present disclosure.

In some embodiments, the source pixel array is divided into several zones, and each zone includes a plurality of pixels. FIG. 5 illustrates an exemplary source pixel array 500 divided into four zones, according to some embodiments of the present disclosure. As shown in FIG. 5, source pixel array 500 is a 6×6 matrix including 36 pixels, and divided into four zones 510 to 540. In this example, source pixel array 500 is equally divided, and each zone has the same shape, i.e., a 3×3 array (i.e., 9 pixels). For each sub-test pattern, only one pixel in each of the four zones is turned on. Therefore, 9 sub-test patterns can be generated and obtained in this example. FIG. 6 illustrates an exemplary process to generate the sub-test patterns, according to some embodiments of the present disclosure. For example, as shown in FIG. 6, referring also to FIG. 5, a first sub-test pattern 601 is obtained by turning on the pixel at the first column of the first row in each zone only, and other pixels in the same zone are off. A second sub-test pattern 602 is obtained by turning on the pixel at the second column of the first row in each zone only, and other pixels in the same zone are off. Following the rule that for each sub-test pattern, only one pixel in each zone is turned on, nine sub-test patterns can be obtained. For example, the ninth sub-test pattern 609 is obtained by turning on the pixel at the third column of the third row in each zone only, and other pixels in the same zone are off. Therefore, all the sub-test patterns (i.e., 601-609) can constitute a full test patten 610. For the full test pattern, all the pixels of the source pixel array have been turned on at least once. In this example, for each sub-test pattern, the pixel turned on in each zone is at the same position in the corresponding zone. In some embodiments, there is no such constraint. For example, a sub-test pattern can be obtained by turning on a pixel at the first column of the first row in the first zone, a pixel at the third column of the second row in the second zone, a pixel at the second column of the second row in the third zone, and a pixel at the first column of the third row in the fourth zone.

In some embodiments, to be more efficient, the sub-test patterns can be obtained by scanning the pixels in each zone in a predetermined order. For example, from top to bottom and from left to right, or any other order, as long as all the pixels of the source pixel array have been scanned.

In some embodiments, the source pixel array 500 can be divided unequally. A number of the divided zones depends on the source pixel array (e.g., test samples). In some embodiments, the number of the source pixel in a divided zones is from 1 to 10000.

In some embodiments, in each sub-test pattern, a distance between two adjacent turned-on pixels is greater than a distance between two adjacent pixels. That is, for each sub-test pattern, the two adjacent pixels are not turned on at the same time, so that pixel level cross-talk can be reduced. Referring back to FIG. 6, one pixel distance (PD) is defined as a distance between two adjacent pixels of a source pixel array. As shown in FIG. 6, for each sub-test pattern, a distance between two adjacent turned-on pixels is 3 PD, which is large enough to distinguish pixels for a NED, such as waveguide AR display. In some embodiments, the distance between two adjacent turned-on pixels is between 1 PD to 10 PD.

At step 404, a plurality of sub-virtual images are obtained. Each sub-virtual image corresponds to one sub-test patterns. The plurality of sub-virtual images corresponds to the plurality of sub-test patterns.

In some embodiments, a first sub-virtual image is rendered for a first sub-test pattern, and captured by an LMD. A second sub-virtual image is rendered for a second sub-test pattern, and then captured. The rendering and capturing are repeated until all the sub-test patterned are performed, therefore all the sub-virtual images are obtained.

Figure 7:
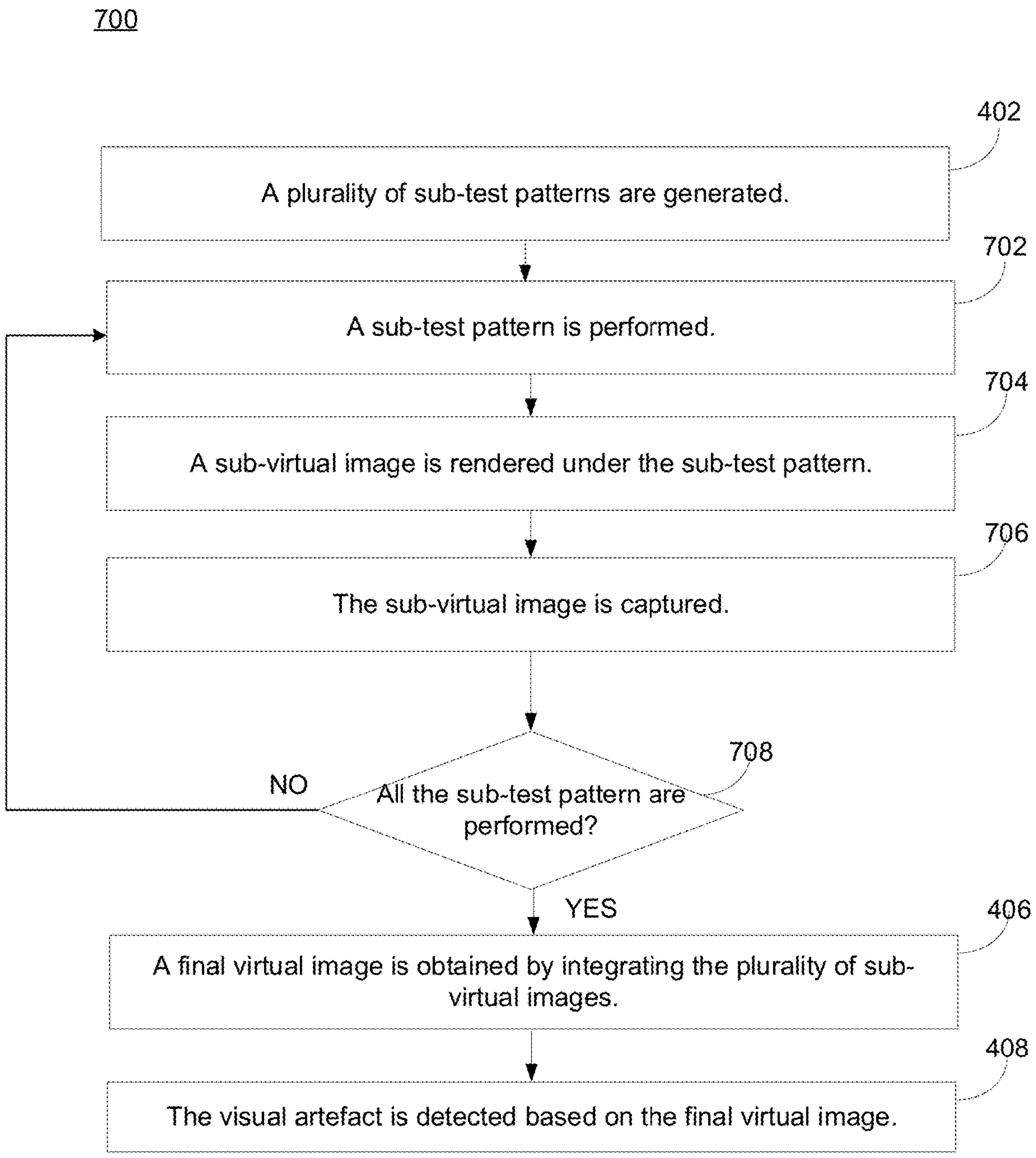
FIG. 7 illustrates a flowchart of another exemplary method for detecting a visual artefact of NED, according to some embodiments of the present disclosure.

FIG. 7 illustrates a flowchart of an exemplary method 700 for detecting a visual artefact of near-eye display, according to some embodiments of the present disclosure. As shown in FIG. 7, step 404 further includes the following steps 702 to 708.

At step 702, a sub-virtual image is rendered for a sub-test pattern. The sub-test pattern is generated by the image generator of NED 110. In each sub-test pattern, only a portion of pixels are turned on.

At step 704, a sub-virtual image is rendered for the sub-test pattern. And the sub-virtual image is displayed to LMD 122. Since only a portion of the pixels are turned on for the sub-test pattern, a cross-talk among pixels may be reduced, so that optical characteristics of the turned on pixels may be clearer.

At step 706, the sub-virtual image is captured. In some embodiments, the sub-virtual image is captured by the LMD 122. In some embodiments, the captured sub-virtual image is a high-resolution image. For example, the output of step 706 can be a high-resolution image (e.g., 10000×10000 pixel) for a virtual image for a sub-test pattern. A registration of virtual image to a source image can be applied as well.

At step 708, it is determined whether all the sub-test pattern have been performed. Referring to the example shown in FIG. 6, a total number of sub-test patterns is 9. If there is still a sub-test pattern that has not been performed, a next sub-test pattern is then performed, that is, steps 702 to 708 are repeated until all the sub-test pattern are performed, and all the sub-virtual images are obtained. If all the sub-test pattern are performed, that is, in this example, the 9 sub-test patterns are all performed, performance of step 406 is completed.

Other steps in FIG. 7 are the same as those described above or will describe hereinafter with reference to FIG. 4, which will not repeated herein.

In some embodiments, the captured sub-virtual image is temporarily stored in the LMD 122 and transmitted to a processor as a batch after all the sub-virtual image are captured. In some embodiments, the captured sub-virtual image is transmitted to the processor once it is captured, and stored in the processor for further processing.

At step 406, a final virtual image is obtained by integrating the plurality of sub-virtual images. After all the sub-virtual image are obtained, all the sub-virtual image are integrated (or referred to as combined, synthesized) into a final virtual image. Since each pixel has been turned on at least once in a one sub-test pattern, the final virtual image can be considered as a virtual image with all the pixels turned on. In some embodiments, the final virtual image is obtained as image data of the full virtual image for further processing. The image data of the respective sub-virtual images are integrated to obtain image data of the final virtual image, without displaying a full virtual image displayed to and captured by LMD 122.

At step 408, the visual artefact, if any, is detected based in the final virtual image. The visual artefact can be detected at the pixel level. That is, a pixel-level defect can be identified. The visual artefact, if any, may include defects, mura/nonuniformity, ghost, etc. In some embodiments, optical characteristics of the final virtual image are obtained, and then the visual artefact is detected based on the optical characteristics. In some embodiments, the optical characteristics comprise luminance and/or chromaticity.

Figure 8:
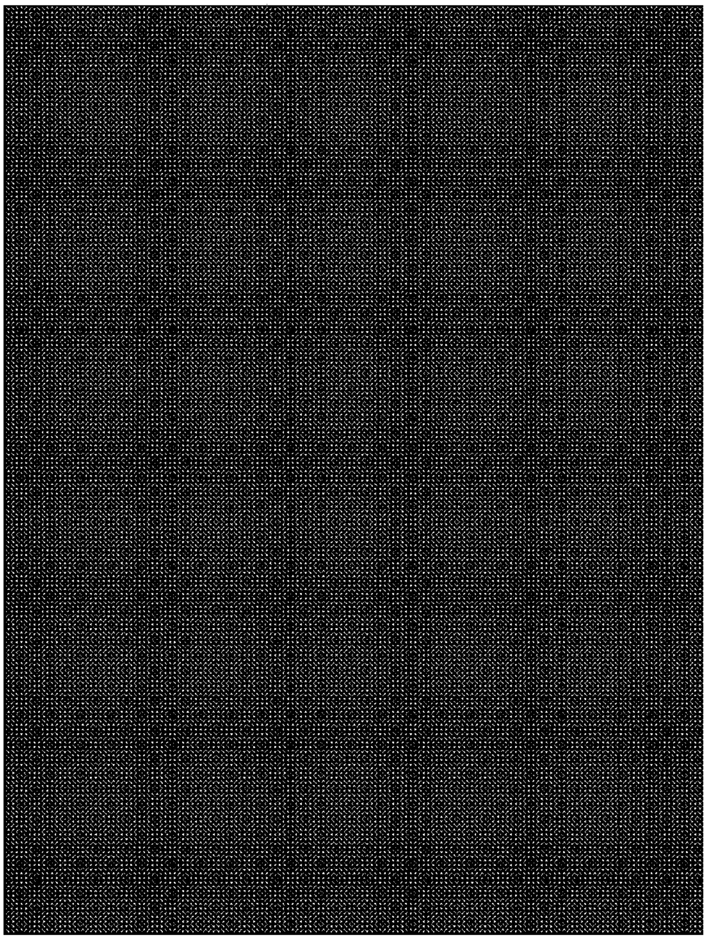
FIG. 8 illustrates an exemplary test pattern image, according to some embodiments of the present disclosure.
Figure 9:
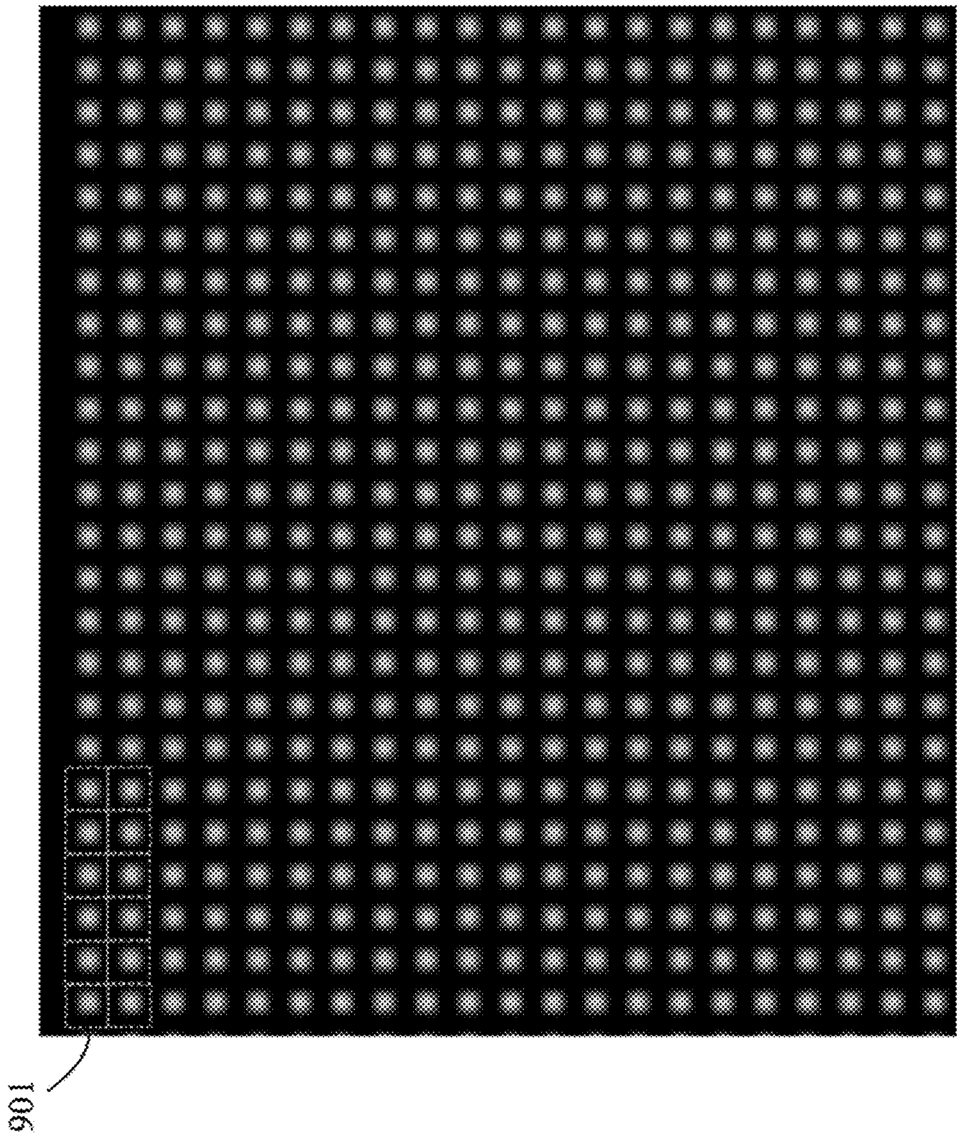
FIG. 9 illustrates an exemplary partial zoomed image of the test pattern image shown in FIG. 8, according to some embodiments of the present disclosure.

FIG. 8 illustrates an exemplary test pattern image, according to some embodiments of the present disclosure. FIG. 9 illustrates an exemplary partial zoomed image of the image shown in FIG. 8, according to some embodiments of the present disclosure.

Referring to FIG. 8 and FIG. 9, for example, the test pattern image has a full size with 640×480 resolution. In FIG. 9, zones 901 are illustrated with dashed box. In each zone 901 with 3×3 pixels, one pixel is turned on with a gray level such as 255. That is, in a sub-test pattern, only one pixel is turned on (for example, sub-test pattern 601 in FIG. 6). The gray value could be any value in the range of the image display, for example a gray value of 1~255 can be used for 8 bits system.

Figure 10:
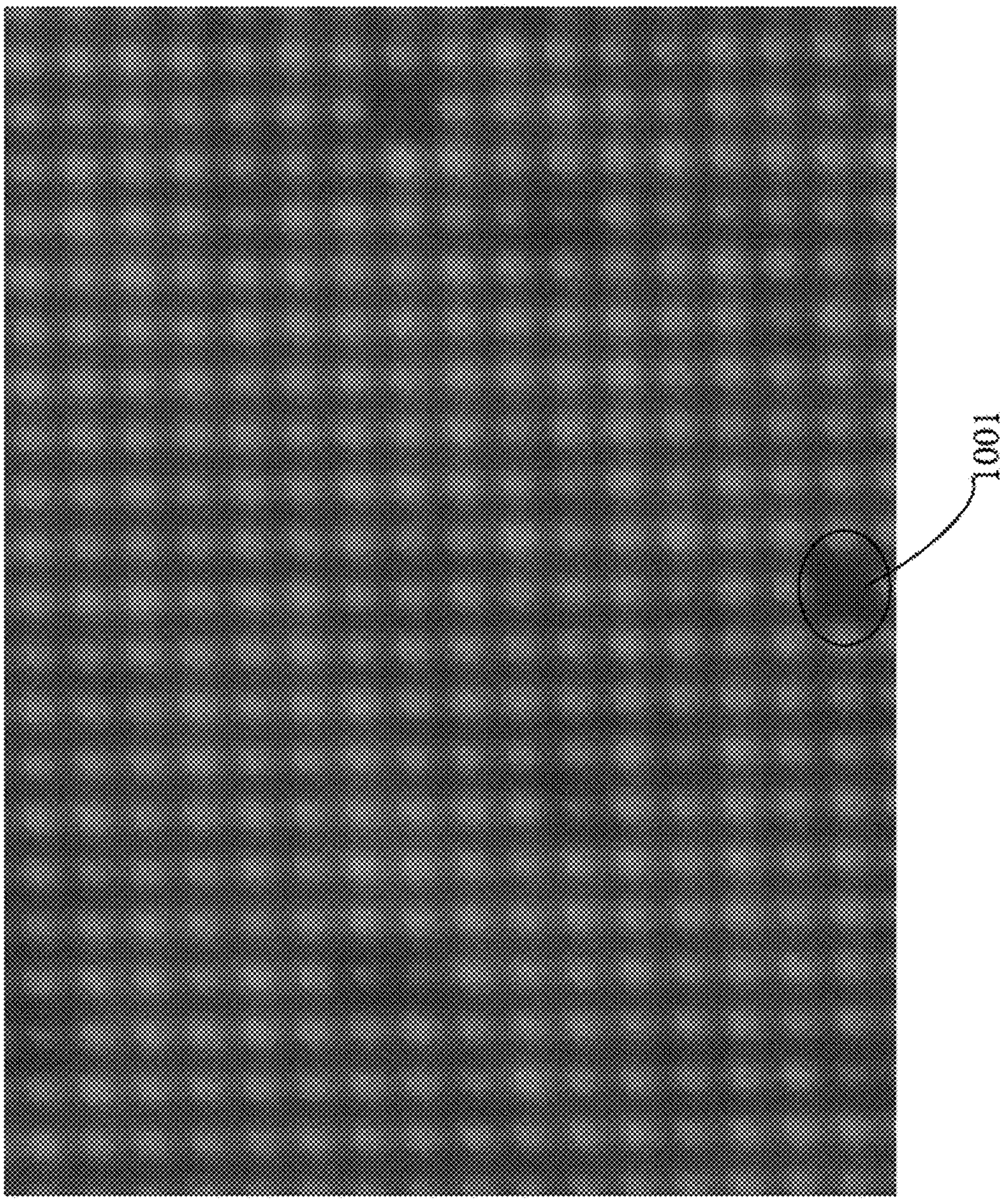
FIG. 10 illustrates an exemplary final virtual image obtained with sub-test patterns, according to some embodiments of the present disclosure.

FIG. 10 illustrates an exemplary final virtual image obtained with sub-test patterns, according to some embodiments of the present disclosure. As shown in FIG. 10, referring also to FIG. 9, the source pixel array is divided into zones with 3×3 pixels. As clearly shown, there is enough pixel distance PD (between two adjacent pixels) to distinguish the pixels from each other. Comparing with FIG. 3, a visual artefact in FIG. 10 can be easily detected in zone 1001 for example, therefore a defect pixel can be easily identified.

In some embodiments of the present disclosure, a device for detecting a visual artefact of a NED is provided. The device can perform the above-described methods. Referring back to FIG. 1, the imaging module 120 is further configured to obtain a plurality of sub-virtual images corresponding to a plurality of sub-test patterns; and detect the visual artefact based on a final virtual image. The processing module 140 is further configured to generate the plurality of sub-test patterns, wherein a sub-test pattern corresponds to partial pixels turned on, and a full test pattern comprising all the plurality of sub-test patterns corresponds to all pixels turned on at least once; and integrating the plurality of sub-virtual images to obtain the final virtual image.

In some embodiments, the processing module 140 is further configured to divide the source pixel array into two or more zones, each zone includes a plurality of pixels; and obtain the plurality of sub-test patterns, the sub-test pattern corresponding to one pixel turned on in each zone.

In some embodiments, the processing module 140 is further configured to generate the sub-test patterns by turning on the one pixel in each zone in a preset order.

In some embodiments, the processing module 140 is configured to generate the sub-test patterns by turning on the one pixel in each zone in a same order.

In some embodiments, the NED 110 is further configured to render a sub-virtual image under a sub-test pattern. The imaging module 120 is configured to capture a corresponding sub-virtual image. The driver module (not shown) is further configured to control the NED 110 and imaging module 120 to repeat the rendering and the capturing until all the plurality of sub-test patterns have been performed.

In some embodiments, the imaging module 120 is further configured to obtain optical characteristics of the final virtual image; and detect a visual artefact based on the optical characteristics.

The details of each step performed by system 100 are the same as the methods described above with reference to FIG. 2 to FIG. 10, which will not repeated herein.

The embodiments may further be described using the following clauses:

1. A method for detecting a visual artefact of near-eye display, comprising:
   - generating a plurality of sub-test patterns, each of the sub-test patterns corresponding to a portion of pixels of a source pixel array of the near-eye display being turned on, and a full test pattern comprising all the plurality of sub-test patterns corresponds to each of the pixels of the source pixel array being turned on at least once;
   - obtaining a plurality of sub-virtual images corresponding to the plurality of sub-test patterns;
   - obtaining a final virtual image by integrating the plurality of sub-virtual images; and
   - detecting the visual artefact, if any, based on the final virtual image.

2. The method according to clause 1, wherein generating the plurality of sub-test patterns further comprises:

- dividing the source pixel array into two or more zones, each of the zones comprising a plurality of pixels; and
   - obtaining the plurality of sub-test patterns, the sub-test pattern corresponding to one pixel turned on in each of the zones.

3. The method according to clause 2, wherein generating the plurality of sub-test patterns further comprises:
   - turning on the one pixel in each of the zones in a preset order.

4. The method according to clause 2 or 3, wherein the two or more zones are divided equally, each of the zones comprising a same number of pixels.

5. The method according to clause 4, wherein each of the zones has a same shape.

6. The method according to clause 5, wherein generating the plurality of sub-test patterns further comprises:
   - turning on the one pixel in each of the zones in a same order.

7. The method according to any one of clauses 1 to 6, wherein in each of the sub-test patterns, a distance between two adjacent turned-on pixels is greater than a distance between two adjacent pixels.

8. The method according to any one of clauses 1 to 7, wherein obtaining the plurality of sub-virtual images corresponding to the plurality of sub-test patterns further comprises:
   - rendering a sub-virtual image for a sub-test pattern and capturing the sub-virtual image; and
   - repeating the rendering and the capturing until all the plurality of sub-test patterns have been performed.

9. The method according to any one of clauses 1 to 8, wherein the sub-virtual image is obtained by a light measuring device (LMD).

10. The method according to any one of clauses 1 to 9, wherein detecting the visual artefact based on the final virtual image further comprises:
    - obtaining optical characteristics of the final virtual image; and
    - detecting the visual artefact based on the optical characteristics.

11. The method according to clause 10, wherein the optical characteristics comprises luminance and/or chromaticity.

12. The method according to any one of clauses 1 to 11, wherein the visual artefact is detected at a pixel level.

13. A system for detecting a visual artefact of near-eye display comprising:
    - a light measuring device (LMD) configured to:
      - obtain a plurality of sub-virtual images corresponding to a plurality of sub-test patterns; and
      - detect the visual artefact based on a final virtual image; and
    - a processor configured to:
      - generate a plurality of sub-test patterns, each of the sub-test patterns corresponding to a portion of pixels of a source pixel array of the near-eye display being turned on, and a full test pattern comprising all the plurality of sub-test patterns corresponds to each of the pixels of the source pixel array being turned on at least once; and
      - integrate the plurality of sub-virtual images to obtain the final virtual image.

14. The system according to clause 13, wherein the near-eye display comprises a source pixel array, and the processor is further configured to:
    - divide the source pixel array into two or more zones, each of the zones comprising a plurality of pixels; and obtain the plurality of sub-test patterns, the sub-test pattern corresponding to one pixel turned on in each of the zones.

15. The system according to clause 14, wherein the processor is configured to generate the plurality of sub-test patterns by turning on the one pixel in each of the zones in a preset order.

16. The system according to clause 14 or 15, wherein the two or more zones are divided equally, each of the zones comprising a same number of pixels.

17. The system according to clause 16, wherein each of the zones has a same shape.

18. The system according to clause 17, the processor is configured to generate the plurality of sub-test patterns by turning on the one pixel in each of the zones in a same order.

19. The system according to any one of clauses 13 to 18, wherein the near-eye display is further configured to render a sub-virtual image for a sub-test pattern; the LMD is configured to capture the sub-virtual image; and the system further comprises a driver configured to control the near-eye display and LMD to repeat the rendering and the capturing until all the plurality of sub-test patterns have been performed.

20. The system according to any one of clauses 13 to 19, wherein the LMD is further configured to:

obtain optical characteristics of the final virtual image; and detect the visual artefact based on the optical characteristics.

21. The system according to clause 20, wherein the optical characteristics comprises luminance and/or chromaticity.

22. The system according to any one of clauses 13 to 21, wherein the visual artefact is detected at a pixel level.

It should be noted that relational terms herein such as “first” and “second” are used only to differentiate an entity or operation from another entity or operation, and do not require or imply any actual relationship or sequence between these entities or operations. Moreover, the words “comprising,” “having,” “containing,” and “including,” and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term “or” encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for detecting a visual artefact of near-eye display, comprising:

generating a plurality of sub-test patterns, each of the sub-test patterns corresponding to a portion of pixels of a source pixel array of the near-eye display being turned on, and a full test pattern comprising all the plurality of sub-test patterns corresponds to each of the pixels of the source pixel array being turned on at least once;

obtaining a plurality of sub-virtual images corresponding to the plurality of sub-test patterns;

obtaining a final virtual image by integrating the plurality of sub-virtual images; and detecting the visual artefact, if any, based on the final virtual image.

2. The method according to claim 1, wherein generating the plurality of sub-test patterns further comprises:

dividing the source pixel array into two or more zones, each of the zones comprising a plurality of pixels; and obtaining the plurality of sub-test patterns, the sub-test pattern corresponding to one pixel turned on in each of the zones.

3. The method according to claim 2, wherein generating the plurality of sub-test patterns further comprises:

turning on the one pixel in each of the zones in a preset order.

4. The method according to claim 2, wherein the two or more zones are divided equally, each of the zones comprising a same number of pixels.

5. The method according to claim 4, wherein each of the zones has a same shape.

6. The method according to claim 5, wherein generating the plurality of sub-test patterns further comprises:

turning on the one pixel in each of the zones in a same order.

7. The method according to claim 1, wherein in each of the sub-test patterns, a distance between two adjacent turned-on pixels is greater than a distance between two adjacent pixels.

8. The method according to claim 1, wherein obtaining the plurality of sub-virtual images corresponding to the plurality of sub-test patterns further comprises:

rendering a sub-virtual image for a sub-test pattern and capturing the sub-virtual image; and repeating the rendering and the capturing until all the plurality of sub-test patterns have been performed.

9. The method according to claim 1, wherein the sub-virtual image is obtained by a light measuring device (LMD).

10. The method according to claim 1, wherein detecting the visual artefact based on the final virtual image further comprises:

obtaining optical characteristics of the final virtual image; and detecting the visual artefact based on the optical characteristics.

11. The method according to claim 10, wherein the optical characteristics comprises luminance and/or chromaticity.

12. The method according to claim 1, wherein the visual artefact is detected at a pixel level.

13. A system for detecting a visual artefact of near-eye display comprising:

a light measuring device (LMD) configured to:

obtain a plurality of sub-virtual images corresponding to a plurality of sub-test patterns; and detect the visual artefact based on a final virtual image; and a processor configured to:

generate a plurality of sub-test patterns, each of the sub-test patterns corresponding to a portion of pixels of a source pixel array of the near-eye display being turned on, and a full test pattern comprising all the plurality of sub-test patterns corresponds to each of the pixels of the source pixel array being turned on at least once; and integrate the plurality of sub-virtual images to obtain the final virtual image.

14. The system according to claim 13, wherein the near-eye display comprises a source pixel array, and the processor is further configured to:

divide the source pixel array into two or more zones, each of the zones comprising a plurality of pixels; and obtain the plurality of sub-test patterns, the sub-test pattern corresponding to one pixel turned on in each of the zones.

15. The system according to claim 14, wherein the processor is configured to generate the plurality of sub-test patterns by turning on the one pixel in each of the zones in a preset order.

16. The system according to claim 14, wherein the two or more zones are divided equally, each of the zones comprising a same number of pixels.

17. The system according to claim 16, wherein each of the zones has a same shape.

18. The system according to claim 17, the processor is configured to generate the plurality of sub-test patterns by turning on the one pixel in each of the zones in a same order.

19. The system according to claim 13, wherein the near-eye display is further configured to render a sub-virtual image for a sub-test pattern; the LMD is configured to capture the sub-virtual image; and the system further comprises a driver configured to control the near-eye display and LMD to repeat the rendering and the capturing until all the plurality of sub-test patterns have been performed.

20. The system according to claim 13, wherein the LMD is further configured to:

obtain optical characteristics of the final virtual image; and detect the visual artefact based on the optical characteristics.

21. The system according to claim 20, wherein the optical characteristics comprises luminance and/or chromaticity.

22. The system according to claim 13, wherein the visual artefact is detected at a pixel level.

* * * * *